(12) United States Patent
Shannon

(10) Patent No.: US 7,173,649 B1
(45) Date of Patent: Feb. 6, 2007

(54) VIDEO AIRSHIP

(76) Inventor: Thomas D. Shannon, 81 Leonard St., New York, NY (US) 10013

( * ) Notice: Subject to any disclaimer, the term of this patent is extended or adjusted under 35 U.S.C. 154(b) by 671 days.

(21) Appl. No.: 10/159,080

(22) Filed: May 29, 2002

Related U.S. Application Data

(60) Provisional application No. 60/295,208, filed on Jun. 1, 2001.

(51) Int. Cl.
*H04N 7/18* (2006.01)

(52) U.S. Cl. ............. 348/144; 348/143; 348/146; 348/145; 348/159; 348/156; 348/52; 348/37; 244/30; 244/31; 244/102 R

(58) Field of Classification Search ............ 348/144, 348/143, 147, 159, 207, 52, 146, 145, 156, 348/37; 359/451, 443; 244/24, 25, 30, 31, 244/102 R; 345/7
See application file for complete search history.

(56) References Cited

U.S. PATENT DOCUMENTS

| | | | |
|---|---|---|---|
| 1,478,034 A | 12/1923 | Hortz | |
| 1,675,914 A | 7/1928 | Silver | |
| 1,684,163 A | 9/1928 | Valentin | |
| 1,750,765 A | 3/1930 | Silver | |
| 1,923,725 A | 8/1933 | Haines | |
| 1,993,414 A | 3/1935 | Respess | |
| 2,379,355 A | 6/1945 | Hodgdon | |
| 2,557,383 A | 6/1951 | Kerwer | |
| 3,079,106 A | 2/1963 | Whitnah | |
| 3,592,157 A | 7/1971 | Schwartz | |
| 4,085,912 A | 4/1978 | Slater | |
| 4,262,864 A | 4/1981 | Eshoo | |
| 4,768,738 A | 9/1988 | Weinert | |
| 5,026,003 A * | 6/1991 | Smith | 244/26 |
| 5,240,206 A * | 8/1993 | Omiya | 244/25 |
| 5,294,076 A | 3/1994 | Colting | |
| RE34,717 E | 9/1994 | Sanders et al. | |
| 5,463,482 A * | 10/1995 | Jones | 349/86 |
| 5,796,376 A | 8/1998 | Banks | |
| 5,801,758 A * | 9/1998 | Heirich | 348/14.16 |
| 5,882,240 A | 3/1999 | Larsen | |
| 5,894,589 A * | 4/1999 | Reber et al. | 725/6 |
| 6,008,784 A | 12/1999 | Acres et al. | |
| 6,010,093 A * | 1/2000 | Paulson | 244/24 |
| 6,041,232 A | 3/2000 | Jennings, III | |
| 6,131,851 A | 10/2000 | Williams | |
| 6,148,551 A | 11/2000 | Glass | |
| 6,982,683 B2 * | 1/2006 | Stanton | 345/7 |
| 2002/0171927 A1 * | 11/2002 | Barnes | 359/451 |

FOREIGN PATENT DOCUMENTS

| | | | |
|---|---|---|---|
| DE | 29800381 U1 * | 5/1998 | |
| FR | 2326326 | * | 6/1977 |
| JP | 09026757 A | * | 5/1998 |

* cited by examiner

*Primary Examiner*—Shawn S. An
(74) *Attorney, Agent, or Firm*—Morgan & Finnegan, L.L.P.

(57) ABSTRACT

The video airship is a lighter-than-air airship, preferably spherical, including a video display disposed with substantially all of the craft's outer surface, a nearly invisible computerized electric propulsion-control system, speakers, microphones, video cameras, communications systems, and extendible landing gear. A power generation system contained within the airship's interior supplies the energy for it's display, propulsion, flight control and other onboard devices.

20 Claims, 4 Drawing Sheets

| Soft Shell | | | | | | |
|---|---|---|---|---|---|---|
| Sphere geometry | | | | | | |
| Diameter | 35.0 | m | | | | |
| Surface Area | 3848.5 | m² | | | | |
| Volume | 22,449.30 | m³ | | | | |
| Frontal Area | 962.1 | m² | | | | |
| Atmosphere | | | | | | |
| Air Density at Sea Level | 1.226 | kg/m^3 | | | | |
| Helium Density at Sea Level | 0.1785 | kg/m^3 | | | | |
| Altitude | 5,000 | ft | 1,524 | m | | |
| Airship Weight | | | | | | |
| "Rubber" Rienforcement | 0.973 | kg/m^2 | 774 | kg | | |
| "Fabric" Rienforcement | 0.002 | 1/m^4 | 1,006 | kg | | |
| Bracing Cables | 0.011 | 1/m^3 | 239 | kg | | |
| Diaphrams | 0.081 | 1/m^2 | 64 | kg | | |
| Ballonet | 0.763 | 1/m^2 | 607 | kg | | |
| Valves, plumbing | 0.007 | 1/m^3 | 157 | kg | | |
| Weight of Cabin | 0.009 | 1/m^3 | 204 | kg | | |
| Weight of Mooring cables and holding devices | 0.007 | 1/m^3 | 157 | kg | | |
| Weight of supports for propulsion system | 0.24 | kg/kW | 68 | kg | | |
| Weight of payload support | 0.09 | kg/kg | 1,187 | kg | | |
| Misc Weight/margin | | | 1,000 | kg | | |
| Airship Weight | | | | | 5,464 | kg |
| Display | | | | | | |
| Peak Optical Power | 0.11 | kW/m2-output | 423 | kW | | |
| Number of LED's | 7 | mW/LED | 60 | Millions | | |
| LED Cost | 0.60 | Average RGB$/LED | 36 | Million $ | | |
| LED Weight | 1.70 | kg/kW-output | 720 | kg | | |
| Optical Power Spec | 0.028 | kW/m2-output | 108 | kW | | |
| LED Efficiency | 0.10 | | | | | |
| Peak Electrical Power | | | 4233 | kW | | |
| Electrical Power Spec | | | 1,078 | kW | | |
| Wiring Weight | 0.0031 | kg/kW-m | 230 | kg | | |
| Encapsulent Weight | 0.100 | kg/m^2 | 385 | kg | | |
| Display Weight | | | | | 1,334 | kg |
| Propulsion (at sea level) | | | | | | |
| Max Air Speed | 15 | m/s | | | | |
| Drag Coefficient | 0.1 | | | | | |
| Propulsion Efficiency | 0.7 | | | | | |
| Max Propulsion Power | 284 | kW | | | | |
| Propulsion Weight | 3.0 | kg/kW | | | 853 | kg |
| Cruise Air Speed | 10.0 | m/s | | | | |
| Cruise Propulsion Power | 84 | kW | | | | |
| Generation | | | | | | |
| Power requirement | 1,161.8 | kW | | | | |
| Generator Weight | 6.3 | kg/kW | | | 7,319 | kg |
| Operation time at max design power | 6.0 | hours | | | | |
| Fuel weight | 0.63 | kg/kW-h | | | 4,392 | kg |
| Fuel Consumption Rate | 732 | kg/h | | | | |
| | 215 | gal/hour | | | | |
| Lift | | | | | | |
| Vehicle Lift per unit Volume | 0.903 | kg/m^3 | | | 20,263 | kg |
| Weight Summary | | | | | | |
| Airship Weight | | | | | 5,464 | kg |
| Display Weight | | | | | 1,334 | kg |
| Propulsion Weight | | | | | 853 | kg |
| Generator | | | | | 7,319 | kg |
| Fuel | | | | | 4,392 | kg |
| Lift | | | | | (20,263) | kg |
| Weight Excess ( ) around the value means lifting | | | | | (900) | kg |

Fig. 3

| Hard Shell (39m) | | | | | | |
|---|---|---|---|---|---|---|
| Sphere geometry | | | | | | |
| Diameter | 39.00 | m | | | | |
| Surface Area | 4778.4 | m² | | | | |
| Volume | 31,059.36 | m³ | | | | |
| Frontal Area | 1194.6 | m² | | | | |
| Atmosphere | | | | | | |
| Air Density at Sea Level | 1.226 | kg/m^3 | | | | |
| Helium Density at Sea Level | 0.1785 | kg/m^3 | | | | |
| Altitude | 5,000 | ft | 1,524 | m | | |
| Airship Weight | | | | | | |
| Shell structure | 5.800 | kg/m^2 | 5,731 | kg | | |
| Bracing Cables | - | kg/m^3 | - | kg | | |
| Diaphrams | 0.081 | kg/m^2 | 80 | kg | | |
| Ballonet | 0.763 | kg/m^2 | 754 | kg | | |
| Valves, plumbing | 0.007 | kg/m^3 | 217 | kg | | |
| Weight of Cabin | 0.009 | kg/m^3 | 283 | kg | | |
| Weight of Mooring cables and holding devices | 0.007 | kg/m^3 | 217 | kg | | |
| Weight of supports for propulsion system | 0.24 | kg/kW | 84 | kg | | |
| Weight of payload support | 0.09 | kg/kg | 1,477 | kg | | |
| Misc Weight/margin | | | 1,000 | kg | | |
| Airship Weight | | | | | 9,843 | kg |
| Display | | | | | | |
| Peak Optical Power | 0.11 | kW/m2-output | 526 | kW | | |
| Number of LED's | 7 | mW/LED | 75 | Millions | | |
| LED Cost | 0.60 | Average RGB$/LED | 45 | Million $ | | |
| LED Weight | 1.70 | kg/kW-output | 894 | kg | | |
| Optical Power Spec | 0.028 | kW/m2-output | 134 | kW | | |
| LED Efficiency | 0.10 | | | | | |
| Peak Electrical Power | | | 5256 | kW | | |
| Electrical Power Spec | | | 1,338 | kW | | |
| Wiring Weight | 0.0031 | kg/kW-m | 318 | kg | | |
| Encapsulent Weight | 0.100 | kg/m^2 | 478 | kg | | |
| Display Weight | | | | | 1,689 | kg |
| Propulsion (at sea level) | | | | | | |
| Max Air Speed | 15 | m/s | | | | |
| Drag Coefficient | 0.1 | | | | | |
| Propulsion Efficiency | 0.7 | | | | | |
| Max Propulsion Power | 353 | kW | | | | |
| Propulsion Weight | 3.0 | kg/kW | | | 1,059 | kg |
| Cruise Air Speed | 10.0 | m/s | | | | |
| Cruise Propulsion Power | 105 | kW | | | | |
| Generation | | | | | | |
| Power requirement | 1,442.6 | kW | | | | |
| Generator Weight | 6.3 | kg/kW | | | 9,088 | kg |
| Operation time at max design power | 6.0 | hours | | | | |
| Fuel weight | 0.63 | kg/kW-h | | | 5,453 | kg |
| Fuel Consumption Rate | 909 | kg/h | | | | |
| | 267 | gal/hour | | | | |
| Lift | | | | | | |
| Vehicle Lift per unit Volume | 0.903 | kg/m^3 | | | 28,034 | kg |
| Weight Summary | | | | | | |
| Airship Weight | | | | | 9,843 | kg |
| Display Weight | | | | | 1,689 | kg |
| Propulsion Weight | | | | | 1,059 | kg |
| Generator | | | | | 9,088 | kg |
| Fuel | | | | | 5,453 | kg |
| Lift | | | | | (28,034) | kg |
| Weight Excess ( ) around the value means lifting | | | | | (902) | kg |

Fig. 4

VIDEO AIRSHIP

RELATED APPLICATION DATA

This application claims priority under 35 U.S.C. §119 to U.S. Provisional Patent Application Ser. No. 60/295,208 entitled "VIDEO AIRSHIP" filed on Jun. 1, 2001 in the name of Thomas D. Shannon, and incorporated herein by reference.

FIELD OF THE INVENTION

This invention relates to lighter-than-air vehicles with video displays.

BACKGROUND OF THE INVENTION

Conventional airships are been modeled after fish or bird-like forms with fin-like control surfaces which nature has demonstrated to move efficiently through fluid or gaseous media. Designs that depart from this basic fluid-dynamic shape, even if excessively attractive, are seldom implemented because they tend to encounter significant bow resistance and trailing drag forces which limit their speed, efficiency and controllability. Additionally, conventional airships tend to employ large, noisy aircraft engines to achieve their forward propulsion.

Conventional airships sometimes carry printed advertising signage, sometimes illuminated from within. For example, some airships have networks of lights attached to their sides which can be programmed to display text and simple images. However, these networks of lights only cover a small portion of the surface of the airship.

SUMMARY OF THE INVENTION

The above-identified problems are solved and a technical advance is achieved in the art by the video airship (VAS) of the present invention. A VAS is a lighter-than-air airship, preferably spherical, including a video display covering substantially all of the craft's total outer surface, a nearly invisible computerized electric propulsion-control system, speakers, microphones, video cameras, communications systems, and extendible landing gear. A power generation system contained within the airship's interior supplies the energy for its display, propulsion, flight control and other onboard devices.

Other and further aspects of the present invention will become apparent during the course of the following description and by reference to the attached drawings.

BRIEF DESCRIPTION OF THE DRAWINGS

FIG. 3 is a table showing specifications for an exemplary video airship having a soft flexible-skin shell.
FIG. 4 is a table showing specifications for an exemplary video airship having a hard shell of ½" carbon fiber honeycomb.

DETAILED DESCRIPTION OF THE INVENTION

General Operation:

A video airship (VAS) is a vessel, preferably spherical, capable of sky travel and of landing in a park, on a beach, on the roof of a building, or at other locations. A VAS may feature three retractable telescoping legs as landing gear, a retractable pilot's control cabin, and a control deck. The legs are ideally long enough to hold a VAS at a high enough height that people may gather underneath. The legs are further ideally designed so that a VAS may land on a spot not much larger than its diameter.

Figure 1:
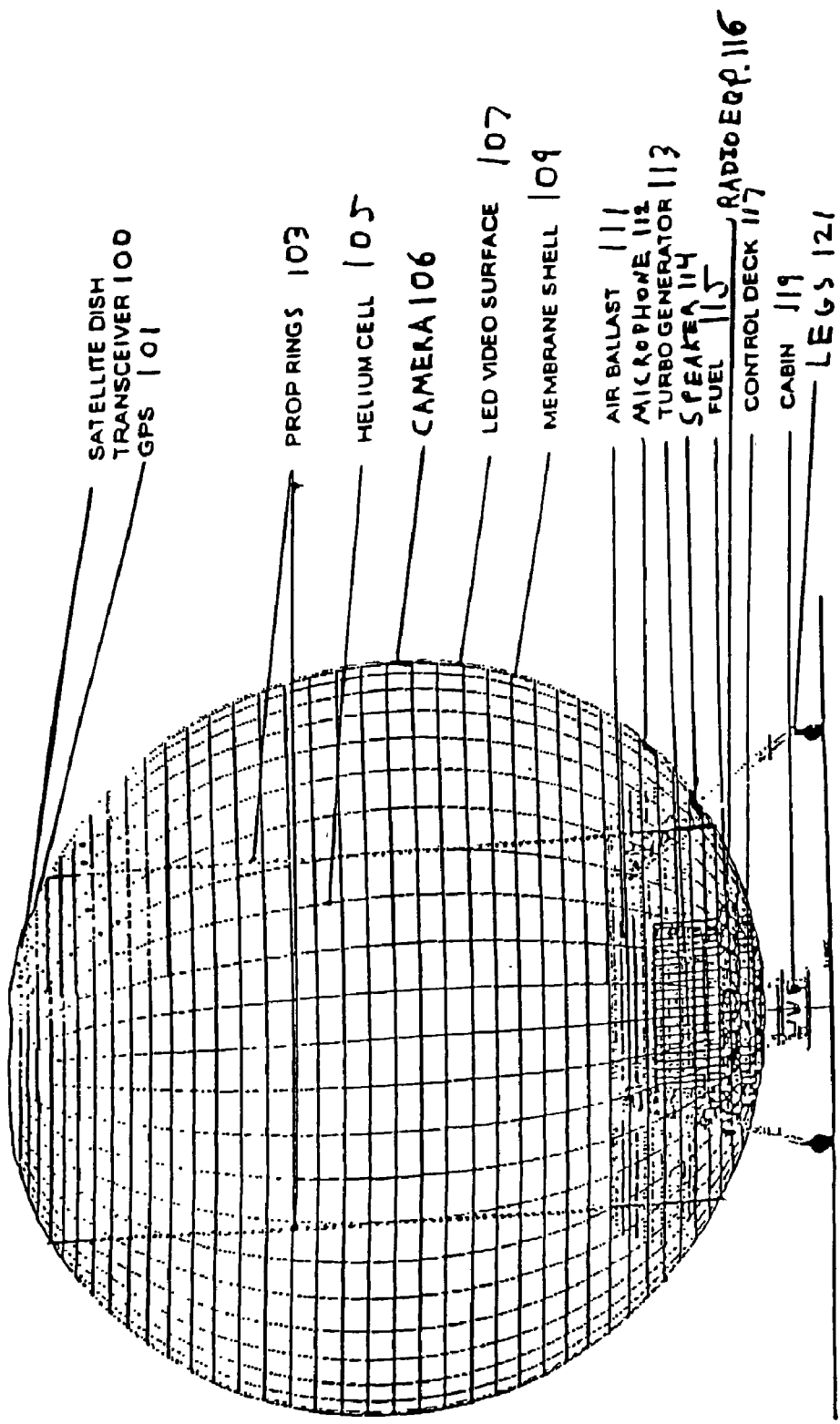
FIG. 1 shows a front view of an exemplary video airship.

As can be seen in FIG. 1, a VAS may be equipped with video cameras 106, microphones 112, speakers 114, satellite transceiver equipment 100, GPS (global positioning system) equipment 101, and radio transmission equipment 116. In some embodiments, GPS units may be located in the top and bottom poles of the ship. In some embodiments, a VAS may additionally include search beacons, strobe lights, lasers, and a cloud maker. The airship may be on-board or remotely piloted, and a VAS's cameras may be used to aid in navigation by providing a human or automated pilot with up to a 360° view of a VAS's surroundings.

A VAS's surface is a radiant, full-color video screen which is visible both at day and at night and is capable of displaying both still and motion picture imagery. In a preferred embodiment, the video screen is implemented by covering a VAS with millions of red, green, and blue light-emitting diodes which are computer controlled. In certain embodiments, the airship may provide stereoscopic 3D images to viewers on the ground who are wearing liquid crystal glasses such as are known in the art. In some cases, a VAS's radio transmission equipment may be used to provide the necessary synchronization signal to such liquid crystal glasses.

Under certain circumstances, a VAS may provide audio as well as video. Audio programming may be delivered to viewers by a VAS in a number of ways. For example, audio may be delivered via a VAS's on-board speakers. As another example, a VAS may use its radio transmission equipment to transmit analog or digital audio information. Such transmitted audio information may be received, for example, by portable receiver units held by viewers on the ground.

Audio/video programming for a VAS may be provided in a number of ways. For example, content may be stored on mass storage situated on a VAS. Alternately, content may be transmitted wirelessly to a VAS via satellite and/or conventional radio frequency signals. The programming may originate from a studio where artists and/or other individuals generate and coordinate the imagery that is shown on a VAS. The studio is ideally equipped with powerful graphical workstations running advanced creative software such as Maya and Photoshop. In some embodiments, the artists and/or other individuals may blend into the content images and sounds received via a VAS's on-board cameras. As a VAS travels, mini VAS's may accompany a standard-size VAS. The cameras of a mini-VAS may, for example, capture views of a standard-size VAS and provide them to the studio for potential use in content creation. The artists and/or other individuals may also blend into the content images and sounds received from outside sources, perhaps received via a VAS website. Under certain circumstances, advertisements may be placed upon a VAS by the studio.

The website, depending on the embodiment, may play a number of roles in the operation of a VAS. As noted above, the website may be used for the submission of artwork to be incorporated into a VAS's content. Software for creating such submissions may be downloadable from the website. The website may also be used to provide web users with real-time views captured by a VAS's cameras and/or with the content currently being delivered by a VAS. For example, when a VAS lands on a beach, web users may see live beach views and hear live beach sounds captured by a VAS's cameras and microphones. The web users might also be able to choose to hear and see the audio and video being delivered from the VAS to the people on the beach. The itinerary for a VAS's travels may also be listed on the website.

Audio/video programming may also be provided by images captured by a ship's video cameras. Preferably, an array of thirty or more cameras allowing up to a 360 degree field of view is employed. By having specific portions of the display present the video captured by adjacent cameras, all or some of the display surface may appear to be a mirrored surface reflecting a VAS's surroundings. By having specific display portions display the video captured by cameras opposite to these portions, all or some of the display surface may appear to be invisible.

When two or more VAS's are in operation, VAS's may provide "teleplacing" functionality to viewers. In teleplacing, for example, a first VAS devotes some or all of its video and/or audio delivery provisions to audio and video captured by the camera and microphones of a second VAS. The second VAS would analogously devote some or all of its video and/or audio delivery provisions to audio and video captured by the camera and microphones of the first VAS. In doing so, people located near the first VAS would be able to see and hear the surroundings of the second VAS, while people located near the second VAS would be able to see and hear the surroundings of the first VAS. Teleplacing may also be used to allow people collocated near various VAS's to communicate with each other.

An operational day for a VAS is now given by way of example. In the morning, a VAS leaves its landing pad. Mini-VAS's may leave along with it. Simultaneously, a ground team may depart in a vehicle, perhaps electrically powered and glass-topped, which maintains constant communication with the VAS. The vehicle can carry a support crew and computers and communication equipment for monitoring a VAS's flight. The VAS could travel over a city displaying content. At some point, the VAS might descend into a park, landing on the three legs which telescope out of its body. People could congregate under the VAS, perhaps teleplacing with a VAS at another location. The VAS could also provide music and imagery so as to provide a dance club like environment for the people congregated near it. The VAS might then leave the park, fly over the city delivering content for a certain amount of time, and then return to its landing pad.

As might be imagined, VAS's can add to the enjoyment of special events such as sporting events and musical concerts. The cameras of a VAS can monitor an event from unique angles and present images of these views to gathered spectators via the integral display screen, and to internet viewers via the website. A VAS may also use its satellite and/or conventional radio transmission equipment to transit the images to broadcasters for incorporation into television programming. In certain cases, a VAS may devote a certain portion of its display or audio capabilities to delivering advertisements. Furthermore, the above-described teleplacing capability may be used to link people at one or more events.

VAS's also have applications in education. A VAS, for example, might appear at a university for a few days for use in workshops and open-air lectures on various subjects. When used in environmental education a VAS might display a live image of earth as observed from an array of satellite-based cameras. The satellite views might be received by a VAS via its satellite transceiver. During the night, a VAS could provide a dance-club environment for students.

VAS's are also useful during certain emergencies. For example, during a power outage a VAS could provide official information via its audio and video delivery facilities. Additionally, by turning its entire display surface white, a VAS could act as an emergency light source. During certain emergencies, a VAS, with its 360° camera capabilities and ability to land in tight places, could act as a search and rescue vehicle.

A landing pad for a VAS may take several forms. For example, a landing pad could be inside a hangar or cultural center. Such a building would preferably have large windows that allow a VAS to be observed from outside the building. A VAS could continue to present content once landed, and this content could be viewed by those outside the building by looking through the windows. Under certain circumstances, parties could be hosted at the hangar or cultural center with audio and video entertainment being provided by a landed VAS. As another example, a landing pad could be on the roof of a large building. A building or hangar associated with a landing pad could also house faculties for maintaining a VAS.

Figure 2:
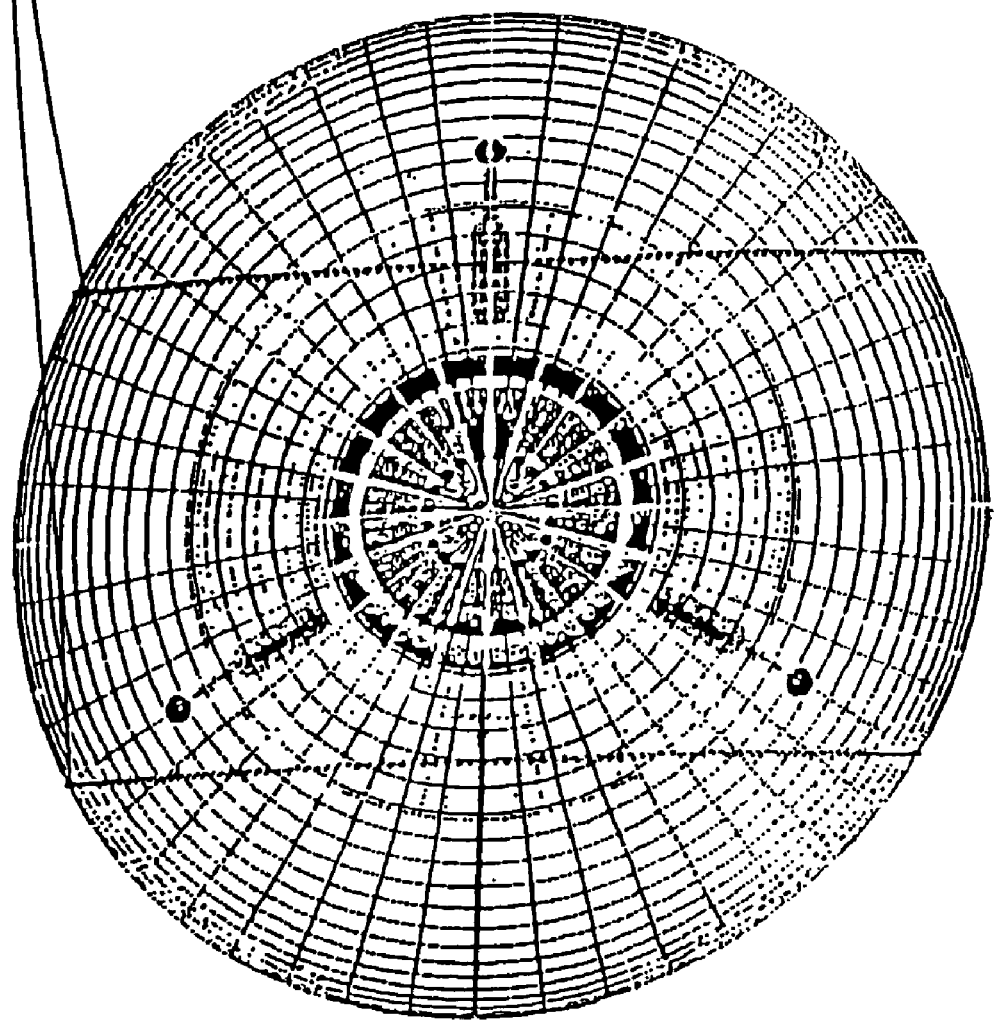
FIG. 2 shows a top view of an exemplary video airship

Technical Aspects:

An exemplary embodiment of a VAS is shown in FIGS. 1 and 2. As noted above, a VAS is an airship, preferably spherically shaped, comprising a rigid lower section to house landing gear in the form of three retractable telescoping legs 121, preferably having motorized wheels for on-ground maneuverability, a retractable pilot's control cabin 119, a control deck 117, video cameras 106, and an enclosed power generation chamber 113. A pressurized envelope (109) provides shape and stiffness for a VAS, with additional reinforcements and structure on the interior. Because all generator equipment needed to power the screen and the propulsion-control system are contained unseen within the sphere and the pilot's control cabin and landing gear are retractable, visual interruption of the total spherical screen is substantially avoided. The ship is supported by helium, or another lighter-than-air gas, which by air displacement provides the vehicle's vertical lift. The helium or other lighter-than-air gas may be contained in one or more cells 105. The vertical motion of the ship is assisted by pumping air in or out of a variable ballast 111.

As noted above, the entire surface of a VAS is covered with a video display 107 comprising a circuit of red, blue and green light emitting diodes (LED's) which are controlled by an onboard computer. Unlike conventional outdoor displays the diodes are preferably of the surface-mounted type, providing 180 degree visibility. Conventional outdoor displays use larger, more directional LED's. Surface-mounted LED's are, as known in the art, available from companies such as Nichia, CREE, Aligent, and LumiLed.

Triplets of red, green, and blue diodes on the display surface constitute individual pixels. It is desirable for the pixel (picture element) resolution of a VAS viewed at 50 meters to be comparable to a television or a laptop monitor at normal viewing distance. Additionally, the average brightness of a VAS should be bright enough to compete with the blue sky of daytime, perhaps having a brightness comparable to that of the moon. Accordingly, on a 35 meter diameter sphere (a surface area of 3,848 square meters), 60 million diodes are preferably used to produce the two million pixels required to produce a quality image clearly visible in daylight. In addition, it is envisioned that an transparent membrane (not shown) supported above the display surface may be employed for purposes such as protecting the display surface.

The propulsion system and the flight control system of a VAS are preferably combined into one or more computer-controlled rings of small, preferably transparent, electric propellers designed to be nearly invisible, quiet, and non-polluting. This propulsion-control system provides a VAS with unusual speed and agility in flight, take-off and landing. Shown in FIGS. 1 and 2 is an embodiment of a VAS wherein two large rings 103 comprised of hundreds of small reversible electric-motor-driven propellers are mounted vertically on the fore and aft surfaces of the sphere.

The propeller rings are positioned on the sphere to reside in the boundary layer, the retarded air flow near the surface of the VAS. The propellers re-invigorate the boundary layer, thereby preventing separation and reducing vehicle drag. Experiments of flows around spheres with suction and blowing (similar to the proposed propulsion system) show that drag coefficients comparable to streamlined bodies can be achieved by such means.

In addition to drag reduction, the rings of propellers provide forward thrust to move the vehicle through the air. The hundreds of propellers within the rings are individually computer-controlled, and stability and control of a VAS is accomplished by differential thrust of these propellers, allowing for rotational torque about any axis. By activating the upper or lower sections of the ring the propellers can drive a VAS up or down. Additionally, the rings of propellers allow a VAS to fly in any direction without rotation of the sphere. Vertical stability of a VAS is enhanced by linkage to the GPS hardware 101. Deviation from vertical is detected and corrected by feedback to the propeller ring sections.

Power for the screen surface, electric propulsion system, computers, landing gear, sound and camera systems, navigation and other equipment may be provided by an array of turbogenerators 113 (or fuel cell generators), preferably isolated in cooled soundproof closets located within the VAS.

These generators have excellent weight to efficiency ratios and both are capable of zero-emission, quiet operation. Heat produced in power generation and in the operation of a VAS is partially used to expand and contract the helium lifting and air ballast gases for vertical motion control.

As is known in the art, a turbogenerator comprises a shaft with a small gas turbine at one end and an electric generator at the other. Although quite similar in its basic functions to diesel-electric hybrids, this type of hybrid offers advantages in its maintenance-free design and more efficient operation. Turbogenerators, for example, have fewer moving parts, and there is no lubrication necessary as it works on a cushion of air. Turbogenerators are usually considered to run on fuel 115 such as gasoline, diesel, or natural gas, but are also capable of running off of renewable and clean fuels such as methanol, vegetable oil, methane, and hydrogen.

As is known in the art, a recuperator preheats combustion air by recovering waste energy from the exhaust, thereby reducing the amount of fuel required to reach the desired turbine inlet temperature. This, in turn, cuts the fuel needed to achieve the required cycle temperatures. The result is improved fuel efficiency over the entire range, with a dramatic improvement at low power. When employing turbogenerators, there is a choice that needs to be made as whether to use heavier, more efficient turbogenerators (which include recuperators to increase efficiency), or lighter, less efficient ones. In a preferred embodiment, a lighter-weight turbo-generator with moderate fuel efficiency is chosen.

FIG. 3 shows specifications for an exemplary VAS having a 35-m diameter spherical geometry and a soft flexible-skin shell. As can be seen from the table, this exemplary VAS has a 900 kg lift surplus meaning that it is theoretically capable of carrying an additional 900 kg in payload.

FIG. 4 shows specifications for an exemplary VAS having a 39-m diameter spherical geometry and a hard shell of ½" carbon fiber honeycomb. The increased diameter allows the VAS to have at least the 900-kg lift surplus of the soft shell VAS, despite the increased mass of the VAS due to the added mass of the hard shell.

RAMIFICATIONS AND SCOPE

The many features and advantages of the present invention are apparent from the detailed specification, and thus it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated herein and, accordingly, all suitable modifications and equivalents which may be resorted to are intended to fall within the scope of the claims.

For example, the form of the above described video globe airship can be modified to accommodate shapes other than spherical (for example, ellipsoidal, cylindrical, teardrop), other types of propulsion engines (for example jets, conventional, ion), other types of display surfaces (for example, phosphor, liquid crystal (including bistable reflective), fiber optic, projection, display inkjet), and other types if gases (for example, hot air), without departing from the present invention.

I claim:

1. An airship, comprising:
a pressurized spherical envelope having an outer surface;
a display screen of light emitting devices covering the entire outer surface of said airship, and providing bright, high resolutions daytime and nighttime viewing of the screen;
a plurality of interactive cameras and sound systems arrayed within the envelope and providing a substantially 360 degree view outside the envelope, each camera adapted to present the video captured in specific portions of the display whereby the display presents at least one image;
a controller for causing specific portions of the display screen to display images captured (a) by adjacent cameras so that some or all of the display screen may appear to be a mirrored surface reflecting the airship's surroundings and (b) by cameras situated opposite to those portions so that some or all of the display screen may blend in with the airship's surroundings;
a computerized electric propulsion-control system including a plurality of transparent propellers forming at least one ring circumscribing the airship, wherein the transparent propeller do not substantially interfere with viewing of the display screen;
a control cabin for local or remote operation of the airship in flight or landed, the control cabin and landing gear being retractable within the envelope for enabling uninterrupted viewing outside the total spherical envelope as a video screen; and
power generating apparatus located within the envelope providing power needs of the airship.

2. The airship of claim 1, wherein said airship is spherically-shaped.

3. The airship of claim 1, wherein the shape of said airship is selected from the group consisting of spherical, ellipsoidal, cylindrical, and teardrop shapes.

4. The airship of claim 1, wherein the display screen comprises an array of light emitting diodes.

5. The airship of claim 4, wherein the light emitting diodes are surface-mounted red, green, blue diodes.

6. The airship of claim 1, wherein the display screen is implemented using a modality selected from the group consisting of phosphor, liquid crystal, bistable reflective liquid crystal, fiber optic, projection, and display inkjet.

7. The airship of claim 1, wherein said display screen displays three-dimensional images.

8. The airship of claim 1, wherein the at least one propeller ring does not substantially interfere with viewing of said display screen.

9. The airship of claim 8, wherein the at least one propeller ring include transparent propellers.

10. The airship of claim 1, further comprising a lighter-than-air gas for providing vertical lift.

11. The airship of claim 1, wherein the video cameras are arranged to provide up to a 360 degree field of view.

12. The airship of claim 1, further comprising a speaker for delivering audio content to the ship's surroundings.

13. The airship of claim 1, further comprising a transceiver for receiving content from a remote location for displaying on the display screen.

14. The airship of claim 1, further comprising a transceiver for transmitting content received from the video cameras to a remote location.

15. The airship of claim 1, further comprising legs which are capable of holding said airship at a height that allows people to gather underneath.

16. The airship of claim 1, further comprising legs which are equipped with motorized wheels for on-ground maneuverability.

17. The airship of claim 1, further comprising forming a vessel as the airship and causing said vessel to display a video portion of a content on an electronic display of said vessel and causing said vessel to provide an audio portion of said content on one or more speakers of said vessel.

18. The airship of claim 17, further comprising causing said vessel to transmit the audio portion of said content to portable receiver units.

19. The airship of claim 18, further comprising transmitting said content via satellite.

20. The airship of claim 18, further comprising transmitting said content via conventional radio signals.

* * * * *